Dec. 27, 1927.   1,653,952
J. J. FERGUSON ET AL.
GROUND LEVER FOR RAILWAY POINTS AND SWITCHES
Filed June 23, 1927
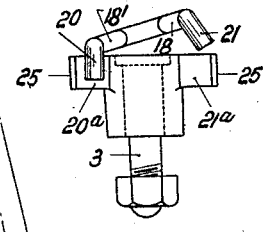
FIG. 4.
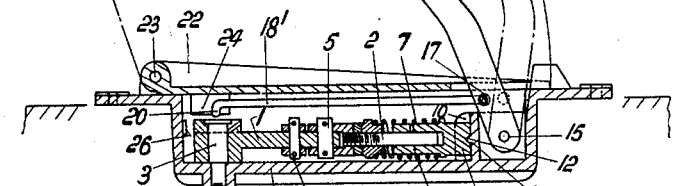
FIG. 1.
FIG. 2.
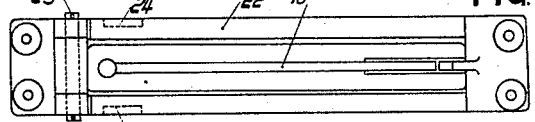
FIG. 3.
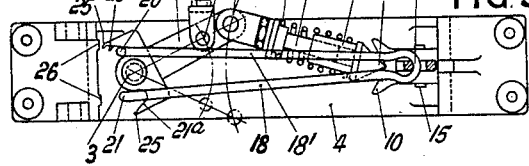
FIG. 5.   FIG. 7.
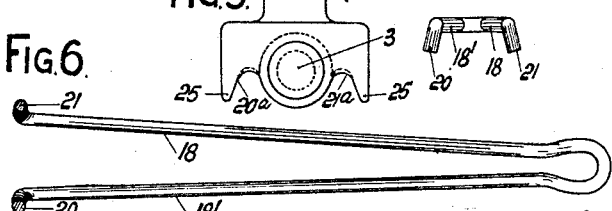
FIG. 6.
Inventors
John James Ferguson, Robert Maguire,
George Johnston Ferguson, John James Ferguson Jr.
James Henry Anderson & Philip McGuire
By Pennie, Davis, Marvin & Edmonds
Attorneys Patented Dec. 27, 1927.

1,653,952

UNITED STATES PATENT OFFICE.

JOHN JAMES FERGUSON, ROBERT MAGUIRE, GEORGE JOHNSTON FERGUSON, JOHN JAMES FERGUSON, JR., JAMES HENRY ANDERSON, AND PHILIP McGUIRE, OF GLASGOW, SCOTLAND.

GROUND LEVER FOR RAILWAY POINTS AND SWITCHES.

Application filed June 23, 1927, Serial No. 200,790, and in Great Britain October 23, 1926.

This invention relates to a ground lever for railway points and switches including a point- or switch-operating arms formed as one member of a toggle, and a spring-urged plunger constituting the other member of the toggle and tending to hold the arm in one of two extreme positions, and an operating handle having a connection with the arm which is so arranged that repeated movements of the handle cause the arm to rock first in one direction and then in the other direction.

The invention has for its object to provide simplified means for connecting the handle with the point- or switch-operating arm.

With this object in view the invention provides an improved point- or switch-operating mechanism of which the operative connection between the handle and the arm is constituted by a bifuracted connecting link jointed at one end to the handle and having at the other end, which overlies the arm, overturned horns, engageable alternately with notches formed one on each side of the fulcrum of the arm, the horns and the walls of the notches being relatively inclined so that, when one notch is engaged by the relative horn and the link is tensioned to shift the arm, the link is rocked about its longitudinal axis sufficiently to move the disengaged horn out of the path of the upper boundaries of the disengaged notch.

In the accompanying drawing Fig. 1 is a part elevation, part vertical section of a point- or switch-operating mechanism constructed in accordance with the invention, Fig. 2 a plan, Fig. 3 a plan showing the cover removed to expose the mechanism, Fig. 4 an end elevation of the point- or switch-operating arm, Fig. 5 a fragmentary plan of one end of said arm, and Figs. 6 and 7 are, respectively, an inverted plan and an end elevation of the connecting link.

The mechanism shown includes point- or switch-operating arm 1 which, together with a spring-urged plunger 2, constitutes a toggle mechanism. The arm 1 is fulcrumed on a pin 3 secured to the point-box 4 and is pivotally connected at 5 to the plunger 2. The plunger 2 is slidable against the action of a spring 7 in a socket 8 which presents at 9 a knife-edge engaging a jaw 10 formed on the box 4, the knife-edge being notched at 11 for engagement with a ridge 12 which prevents upward movement of the socket 8. The arm 1 is connected at 13 to the usual rod 14 connected in turn to the point or switch to be operated.

Fulcrumed in the box at 15 is a handle 16 having at 17 a knuckle-joint with a bifurcated connecting link comprising branches 18, 18' of which the ends remote from the knuckle-joint overlie the arm 1, the said ends being formed with overturned horns 20, 21 engageable alternately with notches 20ª and 21ª one on each side of the fulcrum of the arm. The horns and the walls of the notches are relatively inclined, so that, when a horn effectively engages a notch and the connecting link 18, 18' is tensioned, the link is rocked about its longitudinal axis sufficiently to move the disengaged horn out of the path of the upper boundaries of the disengaged notch.

In the operation of the mechanism to shift the arm 1 from the Fig. 3 position into the next position, i. e., into the position shown in dotted lines in Fig. 3, the handle 16 is operated in the direction indicated by the arrow "A" in Fig. 1 to move the link 18, 18' whereby the horn 20 is caused to enter the notch 20ª. When tension is applied to the link 18, 18' by the handle 16, the horn 20 forcibly engages the notch 20ª and by reason of the inclination of the horn relatively to the walls of the notch 20ª the link is caused to rock about its longitudinal axis sufficiently to ensure that the horn 21 is clear of the upper boundaries of the notch 21ª as shown in Fig. 4. Continued tension applied to the link 18, 18' is accompanied by shifting movement of the arm 1 into the position indicated by the dotted lines in Fig. 3, the horn 21 during the shifting movement riding over the surface of the arm 1 clear of the notch 21ª. It will be understood that, as soon as the pivot 5 of the toggle mechanism passes the line joining the knife-edge 9 and the axis of the fulcrum pin 3, the arm 1 is caused to complete its shifting movement by the spring 7 without interference with the handle, the boundaries of the notch 21ª being then clear of the horn 21. When the arm 1 is in the position shown in dotted lines in Fig. 3, the handle 16, when released, falls backwards by gravity into the position indicated in full lines in Fig. 1, this position being such that the horn 21 is caused to ented the notch 21ª and on the link 18, 18' being tensioned, the link is rocked into a position such that the horn 20 is clear of the boundaries of the notch 20ª, continued tension on the link being accompanied by rocking movement of the arm into the position shown in full lines in Fig. 3.

The mechanism accommodated in the box 4 is enclosed by a cover 22 hinged at 23. Formed in the cover 22 are lugs 24 which constitute guides limiting the lateral movement of the link 18, 18'. The arm 1 is formed with toes 25 engageable with stops 26 which, when the rod 14 is disconnected, limit the travel of the toggle mechanism.

We claim:—

In point- or switch-operating mechanism of the kind referred to, in combination, a rockable handle, a pivoted operating arm having notches one on each side of its pivot, and a link for operatively connecting said handle and said arm, said link being jointed at one end to said handle and having at the other end horns engageable alternately with said notches in the reciprocation of said link effected by rocking said handle, said horns and the walls of said notches being relatively inclined.

In testimony whereof we have signed our names to this specification.

JOHN JAMES FERGUSON.
  ROBERT MAGUIRE.
  GEO. JOHNSTON FERGUSON.
  JOHN JAMES FERGUSON, Junior.
  JAS. H. ANDERSON.
  PHILIP McGUIRE.